(12) United States Patent
Hunter et al.

(10) Patent No.: US 8,052,781 B2
(45) Date of Patent: Nov. 8, 2011

(54) INTEGRATED WASTE TONER AND OZONE COLLECTION SYSTEM

(75) Inventors: Jonathan B. Hunter, Marion, NY (US); Keith M. Wasula, Rochester, NY (US); James J. Spence, Honeoye Falls, NY (US)

(73) Assignee: Xerox Corporation, Norwalk, CT (US)

( * ) Notice: Subject to any disclaimer, the term of this patent is extended or adjusted under 35 U.S.C. 154(b) by 880 days.

(21) Appl. No.: 12/101,371

(22) Filed: Apr. 11, 2008

(65) Prior Publication Data
US 2009/0255401 A1   Oct. 15, 2009

(51) Int. Cl.
*G03G 21/10* (2006.01)

(52) U.S. Cl. ............. 95/273; 55/385.1; 399/35; 399/93; 399/98; 399/120

(58) Field of Classification Search ............... 55/385.1, 55/307, 358, 282.2, 428, 429, 430; 95/54, 95/271, 273; 399/35, 93, 98, 120
See application file for complete search history.

(56) References Cited

U.S. PATENT DOCUMENTS

| | | | |
|---|---|---|---|
| 5,028,959 A * | 7/1991 | Gooray | 399/93 |
| 5,521,690 A * | 5/1996 | Taffler et al. | 399/93 |
| 5,862,439 A * | 1/1999 | Pozzanghera | 399/98 |
| 6,522,847 B2 * | 2/2003 | Nanjo | 399/92 |
| 2008/0219695 A1 * | 9/2008 | Doshohda et al. | 399/93 |

\* cited by examiner

*Primary Examiner* — Duane Smith
*Assistant Examiner* — Minh-Chau Pham
(74) *Attorney, Agent, or Firm* — Oliff & Berridge, PLC

(57) ABSTRACT

The present disclosure provides for a device that can include a waste collector, a system that transports waste stream of particle matter from a housing, a system that transports a waste stream of effluent and particle matter from the housing, and a separator that receives the waste streams and collects the particle matter into the waste collector.

16 Claims, 4 Drawing Sheets

INTEGRATED WASTE TONER AND OZONE COLLECTION SYSTEM

BACKGROUND

Waste collection and transport may involve multiple types of waste matter. The waste matter may include solid, liquid, gaseous or plasma phases. Waste matter may also include multi-phase material, such as particles in a gas, such as atmospheric gases. The particle density or count can vary considerably. The particle and gas species can also vary.

A single type of transport system is normally used to move single-phase and multi-phase waste to waste processors and collectors. Mass transport and processing requirements do differ, however, depending on the physical and chemical properties of the waste.

Electrophotographic systems can generate waste toner and ozone as byproducts of normal operation. For example, latent images that include waste toner may remain on an electrophotographic drum or belt after image transfer. Waste toner may also be ejected from a developer housing in the electrophotographic system.

SUMMARY

The present disclosure provides for a device that can include a waste collector, a system that transports waste stream of particle matter from a housing, a system that transports a waste stream of effluent and particle matter from the housing, and a separator that receives the waste streams and collects the particle matter into the waste collector.

The separator can include a proximal and a distal end with respect to the waste container. The proximal end can receive the waste stream of particle matter and the distal end can receive the waste stream of effluent and particle matter. The particle matter of the waste streams can be combined at the proximal end of the separator.

The disclosed device can also include a filter that filters the effluent. The filter can contain an effluent-borne particle stream and pass a gaseous effluent. The disclosed device may also include an ozone processor that removes ozone from the gaseous effluent. The ozone processor can be a catalytic converter, a thermal chamber, an ultraviolet light chamber, or a storage chamber.

In an aspect of this disclosure, the filter and the ozone processor can be combined in a hybrid filter.

A further aspect of the disclosed device may include a collection system that receives the waste stream of particle matter from a plurality of waste apertures in the housing. The transport system for the waste stream of particle matter can include an auger that advances the first waste stream to the waste collector.

The separator of the disclosed device can include a cyclone separator that receives the waste stream of particle matter proximal to the waste container and the waste stream of effluent and particle matter distal to the waste container. The cyclone separator can collect the particle matter of the first and second waste streams into the waste container under the influence of gravity. In an aspect of the present disclosure, the particle matter can include toner.

The present disclosure can provide for a device that includes a waste collector, a transport system transports a waste stream of particle matter from a housing, a transport system transports a waste stream of effluent and particle matter from the housing, a separator that has a proximal and a distal end with respect to the waste collector. The separator can receive the waste stream of particle matter and the waste stream of effluent and particle matter at the proximal and distal ends, respectively. The separator can collect the particle matter of both waste streams into the waste collector under the influence of gravity.

The present disclosure can provide for a method of isolating particle matter from an electrophotographic device housing. The method can include transporting a waste stream of particle matter from the electrophotographic device housing, transporting a waste stream of effluent and particle matter from the electrophotographic device housing, separating the effluent and the particle matter in the second waste stream using a cyclone, and combining the particle matter of both waste streams into the waste collector under the influence of gravity.

In a further aspect of the present disclosure, the method can include filtering the effluent to contain an effluent-borne particle stream and allow a gaseous effluent to pass. The present disclosure can further provide for removing ozone from the gaseous effluent. Techniques that remove ozone can include catalytic conversion, heat treatment, ultraviolet light treatment, and storage.

The disclosed method can, as a further aspect, include collecting the waste stream of particle matter from a plurality of waste apertures in the electrophotographic device housing. An additional aspect of the collecting step can include advancing the waste stream of particle matter from the waste apertures of the housing to the waste collector by using an auger.

The present disclosure can provide for a method of isolating particle matter from an electrophotographic device housing, that includes 1) transporting a waste stream of particle matter from the housing, 2) transporting a waste stream of effluent and particle matter from the housing, 3) combining both particle matter streams into the waste collector under the influence of gravity, 4) filtering the effluent to contain effluent-borne particles and allow a gaseous effluent to pass, and removing ozone from the gaseous effluent.

BRIEF DESCRIPTION OF THE DRAWINGS

The disclosure will make reference to the accompanying figures, wherein like numerals represent like elements, and wherein.

EMBODIMENTS

Figure 1:
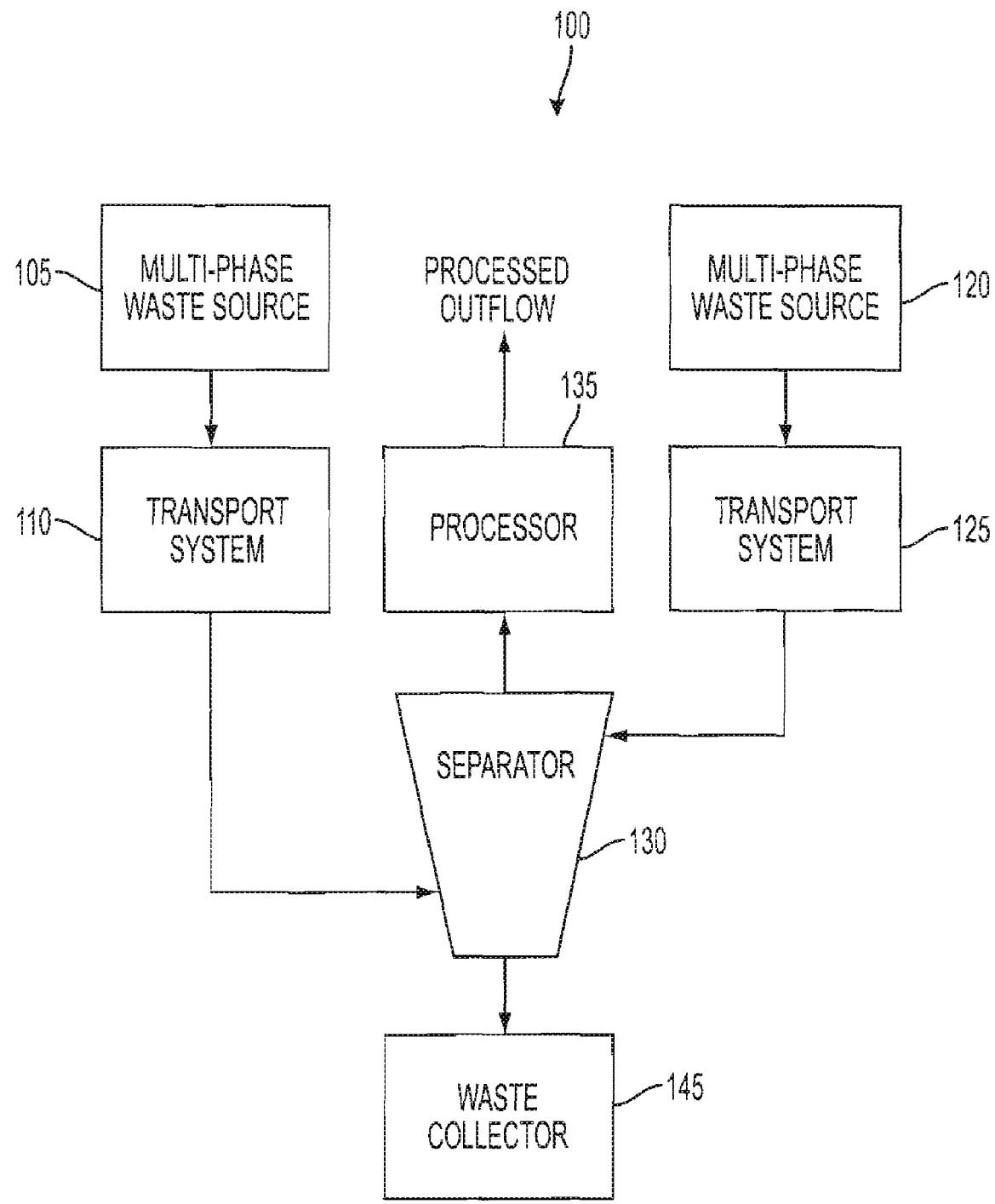
FIG. 1 is a diagram of an exemplary multi-source, multi-phase waste aggregator.

FIG. 1 shows an exemplary diagram of a multi-source, multi-phase waste aggregator 100 that includes a multi-phase waste source 105, a multi-phase waste source 120, a transport system 110, a transport system 125, a separator 130, a processor 135, and a waste collector 145. The waste elements in waste streams from multi-phase waste source 105 and multi-phase waste source 120 can be coupled to the waste collector 145 and the processed outflow of processor 135. For example, the multi-phase waste source 105 can couple a waste stream to the transport system 110. The transport system 110 can couple the waste stream to the separator 130. The waste stream may be said to be injected into the separator 130. The separator 130 can couple the waste stream to waste collector 145. The multi-phase waste source 120 can couple a waste stream to the transport system 125. The transport system 125 can couple the waste stream to the separator 130. The separator 130 can couple the waste stream to the processor 135 and to the waste collector 145.

The multi-phase waste source 105 can include a particle stream and gas stream. For example, multi-phase waste source 105 can include particle matter, such as waste toner with atmospheric gases from a housing within an electrophotographic system. Multi-phase waste matter streams, such as streams from the multi-phase source 105, may arise in electrophotographic systems. The waste toner can be described as an admixture or mixture of a solid phase, the toner particles, and a gas phase, the atmospheric gases. In other words, the waste toner can include toner particles and atmospheric gases or other gas species between the toner particles.

The multi-phase waste source 120 can include material phases, such as a solid, a liquid, or a gas. For example, multi-phase waste source 120 can include a gas combination and particle matter, such as an ozone-air mixture with waste toner particles. The gas combination with some effluent-borne particle matter can be described as an effluent. The gas combination can be described as a gaseous phase effluent. The gaseous phase effluent may include a noxious gas, such as ozone. The gas phase effluent may be ejected or flow out of the multi-source, multi-phase waste aggregator 100 after removal of the noxious gas.

The transport systems 110 and 125 can differ according to the mixture and phase or phases of the waste material. Transport systems 110 and 125 can include multiple transport subsystems that propel and deliver material collected at multiple locations. Each transport system 110 and 125 may or may not conserve a mixture ratio of the material being transported. Transport system 110 can densify, condense, expand, or dilate a waste toner stream. Transport system 110 can include an auger, a conveyer, an agitator or shaker with a gravity-fed drop chute, and the like. For example, the transport 110 can advance or propel a waste stream towards the waste collector 145 using an auger that includes a tube and a constant or variable pitch helical screw.

Transport system 125 can include ducts, manifolds, pressure sources, pneumatic pumps, plenums, and the like. The pressure sources can be positive or negative pressure sources with respect to atmospheric pressure. For example, the pressure sources can be centrifugal blowers that draw a vacuum.

It should be appreciated that portions of the transport systems 110 and 125, such as centrifugal blowers, can provide mechanical, pneumatic, electrical, or chemical power that operates separator 130. Power from transport system 125 can couple to transport system 110 and vice versa. For example, the vibration from cyclone blowers and/or augers included in transport system 125 can power a spring element that agitates particles toward a gravity-fed central collector or drop chute in transport system 110.

Separator 130 can include elements that separate and combine waste streams or portions of waste streams. Separator 130 can partially or completely separate or un-mix a mixture of multi-phase waste streams and can cross couple the waste streams to the waste collector 145 and to a waste processor 135. Separator 130 can direct a segregated waste stream with a new mixture to processor 135. For example, separator 130 can direct an effluent that includes an ozone-rich gas stream with reduced toner particle concentration, i.e., effluent-born particles, to processor 135.

Separator 130 can combine or collect waste streams and portions of waste streams into the waste collector 145. For example, a waste stream and a toner portion of an ozone-rich waste stream can be combined at or below a frustum plane of a cyclonic separator. Separator 130 can include a duct, manifold, plenum, or other enclosure that combines waste streams and portions of waste streams. A proximal and distal end of the separator 130 can adjoin the waste collector 145 can couple a segregated waste stream to the processor 135, respectively.

Processor 135 can filter and store a portion of a segregated waste matter stream and modify the physical or chemical properties of another portion. For example, processor 135 can change a gas species through catalytic conversion, a chemical reaction, and the like. Processor 135 can, for example, include a filter that further includes a high efficiency particulate arrestor (HEPA) filter and a catalytic converter that converts ozone ($O_3$) to diatomic oxygen. Processor 135 can convert ozone to diatomic oxygen with heat, ultra-violet (UV) light, storage until ozone spontaneously converts to diatomic oxygen, and the like.

Figure 2A:
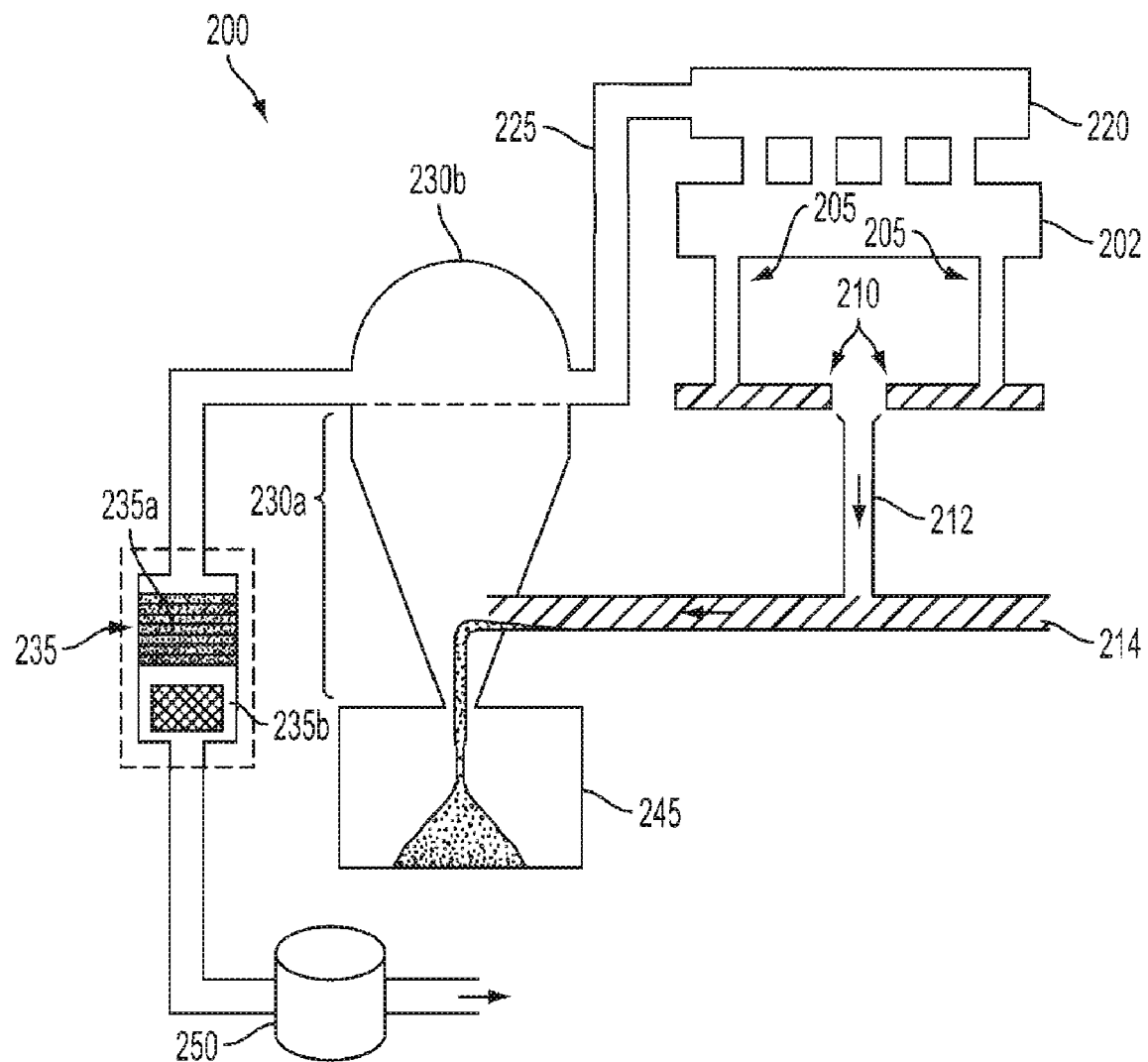
FIG. 2 is a diagram of an exemplary integrated waste toner and ozone collection system.
Figure 2B:
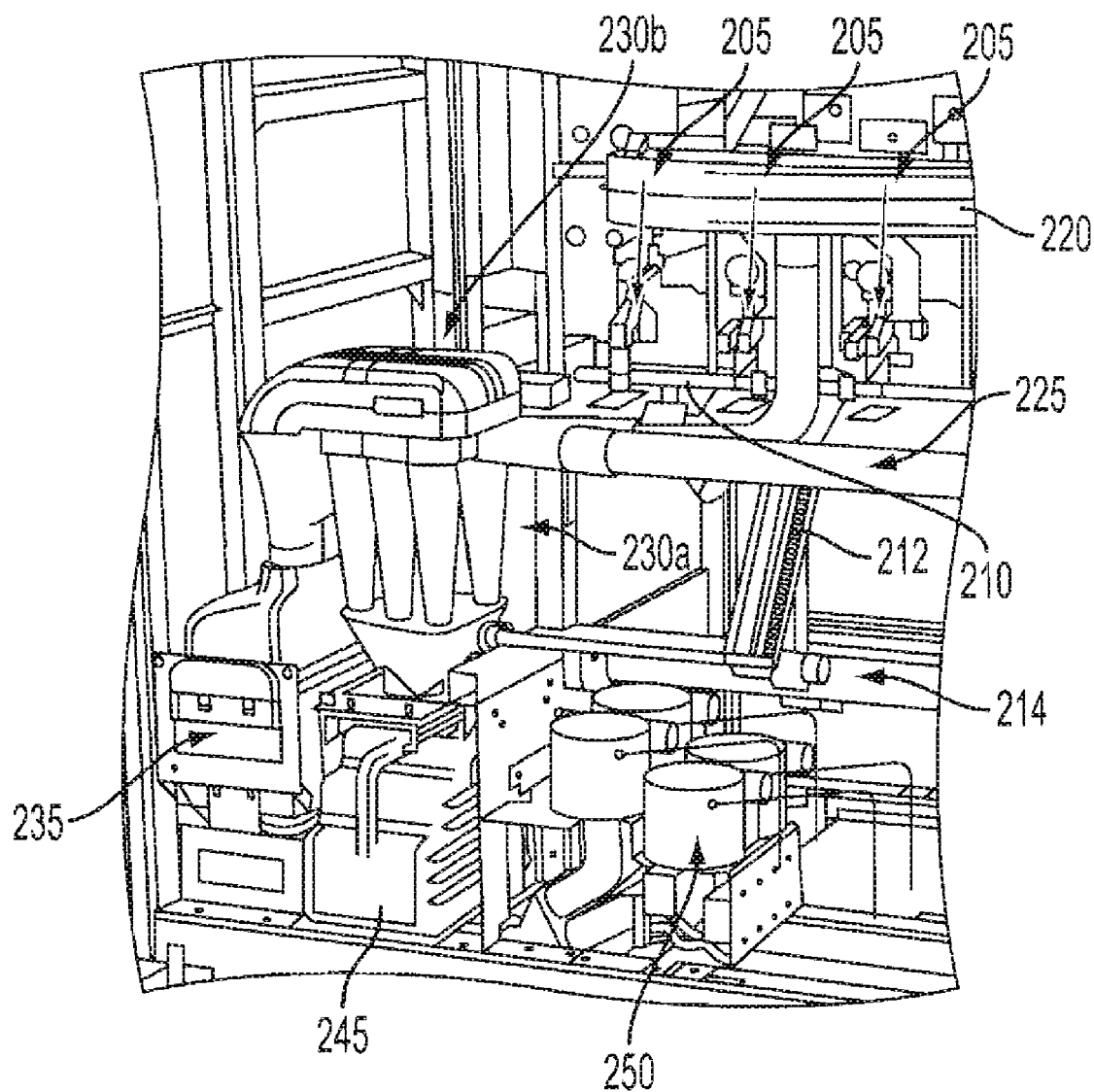

FIG. 2 shows a diagram of an exemplary integrated waste toner and ozone collection system 200 that includes an ozone manifold 220, an ozone transport system 225, a waste toner inlet system 205, a primary auger 210, a central collector 212, a secondary auger 214, a separator body 230a, a cyclone separation head 230b, a filter 235, a waste toner collection container 245, and cyclone blowers 250. The filter 235 can include a filter stage 235a and a converter 235b.

The waste toner inlet system 205 can couple a waste toner stream to a primary auger 210. The primary auger 210 can couple the waste toner stream to the central collector 212. The central collector can couple the waste toner stream to the secondary auger 214. The secondary auger can couple the waste toner stream to the separator body 230a. The separator body 230a can couple the waste toner stream to the waste toner collection container 245.

The ozone manifold 220 can couple an ozone-rich gas steam to an ozone transport system 225. The ozone transport system 225 can couple the ozone-rich gas steam to the cyclone separation head 230b. The cyclone separation head 230b can couple to the separator body 230a and to the filter 235. The filter stage 235b can couple a filtered gas stream to converter 235b. The filter 235 can couple to the cyclone blowers 250.

The ozone manifold 220 can collect ozone or ozone plus particles such as waste toner. It should be appreciated that ozone manifold 220 and transport system 225 can include vacuum lines that are below atmospheric pressure. The cyclone blowers 250 can reduce the pressure in transport system 225 and in ozone manifold 210 so that an ozone-bearing waste stream is drawn into the filter 235, which can filter the waste stream using a filter stage 235a, and can catalyze the filtered waste stream to form diatomic oxygen using a converter 235b.

A transport system, such as primary auger 210, central collector 212, and secondary auger 214 can include agitating elements that parasitically couple vibrational energy from a waste aggregator, such as a multi-source, multi-phase waste aggregator 100. The primary auger 210 and secondary auger 214 can include auger elements such as helical shafts, or can include conveyer transporters, such as a conveyor belt, an air conveyer, and the like.

Figure 3:
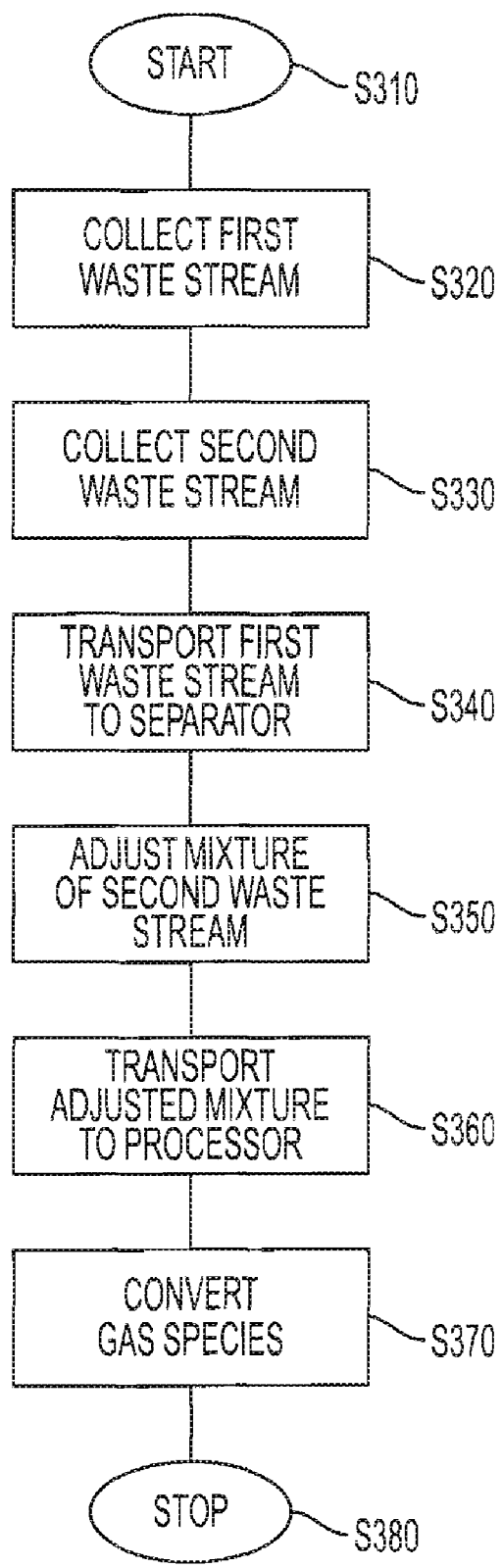
FIG. 3 shows an exemplary process flow.

FIG. 3 shows an exemplary process flow 300 that can start with step S310 and can proceed to step S320 in which a first waste stream is collected. The first waste stream can include a mixture of toner particles and air. From step S320, program flow can proceed to step S330 in which a second waste stream is collected. The second waste stream can include a mixture of ozone, atmospheric gases, and waste toner particles or dust. From step S330, program flow can proceed to program step S340 in the first waste stream is transported to a separator. For example, waste toner may enter a separator body and may be conducted from the separator body to a waste collector under the influence of gravity.

From program step S340, the program flow can proceed to step S350 in which the mixture ratio of the second waste stream is adjusted. For example, a preponderance of waste toner particles can be separated from an ozone-air gas stream in a separator head and a separator body. From program step S350, program flow can proceed to program step S360 in which the adjusted second mixture can be are transported a processor. For example, an ozone-rich gas stream can be transported from a separator to a hybrid filter that includes a catalytic converter.

From program step S360, program flow can proceed to step S370 in which a processor can convert a gas species in the adjusted second mixture to another gas species. For example, the processor can convert ozone to diatomic oxygen. From program step S370, program flow can proceed to program step S380 in which the program can stop.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A device comprising:
   a waste collector;
   a first transport system that is configured to transport a first waste stream of toner from a housing;
   a second transport system that is configured to transport a second waste stream of effluent and toner from the housing;
   a separator, coupled to the first and second waste transport systems and the waste collector, that is configured to receive the first and second waste streams and to collect both the toner of the second waste stream and the toner of the first waste stream into the waste collector;
   a filter, coupled to the separator, that is configured to filter the effluent of the second waste stream to contain an effluent-borne particle stream and pass a gaseous effluent, and
   a blower coupled to the filter;
   wherein the filter and the blower are each disposed at a location that is outside of, and downstream from, the separator.

2. The device of claim 1, wherein the separator has a proximal and a distal end with respect to the waste collector, the proximal end receives the first waste stream and the distal end receives the second waste stream.

3. The device of claim 2, wherein the toner of the first and second waste streams are combined at the proximal end of the separator.

4. The device of claim 1, further comprising:
   an ozone processor, coupled to the filter, that is configured to remove ozone from the gaseous effluent.

5. The device of claim 4, wherein the ozone processor is at least one of a catalytic converter, a thermal chamber, an ultraviolet light chamber, and a storage chamber.

6. The device of claim 5, wherein the filter and the ozone processor are combined in a hybrid filter.

7. The device of claim 1, further comprising:
   a first collection system, coupled to the first transport system, the first collection system being configured to receive the first waste stream from a plurality of waste apertures in the housing.

8. The device of claim 7, wherein the first transport system further comprises:
   an auger, coupled to the first collection system, the auger advancing the first waste stream to the waste collector.

9. The device of claim 1, wherein the separator is a cyclone separator that receives the first waste stream proximal to the waste collector and the second waste stream distal to the waste collector, and collects the toner of the first and second waste streams into the waste container under the influence of gravity.

10. A device comprising:
    a waste collector;
    a first transport system that is configured to transport a first waste stream of toner from a housing;
    a second transport system that is configured to transport a second waste stream of effluent and toner from the housing;
    a separator, coupled to the first and second waste streams and the waste collector, having a proximal and a distal end with respect to the waste collector, that is configured to receive the first and second waste streams at the proximal and distal ends, respectively, and collect both the toner of the second waste stream and the toner of the first waste stream into the waste collector under the influence of gravity;
    a filter, coupled to the separator, that is configured to filter the effluent of the second waste stream to contain an effluent-borne particle stream and pass a gaseous effluent; and
    a blower coupled to the filter;
    wherein the filter and the blower are each disposed at a location that is outside of, and downstream from, the separator.

11. A method of isolating toner from an electrophotographic device housing, the method comprising:
    transporting a first waste stream of toner from the electrophotographic device housing;
    transporting a second waste stream of effluent and toner from the electrophotographic device housing;
    separating the effluent and toner in the second waste stream in a cyclone separator;
    combining both the toner of the second waste stream and the toner of the first waste stream into a waste collector under the influence of gravity;
    filtering the effluent of the second waste stream to contain an effluent-borne particle stream and passing a gaseous effluent in a filter; and
    blowing the gaseous effluent with a blower;
    wherein the filter and the blower are each disposed at a location that is outside of, and downstream from, the cyclone separator.

12. The method of claim 11, wherein the method further comprises removing ozone from the gaseous effluent by at least one of catalytic conversion, heat treatment, ultraviolet light treatment, and storage.

13. The method of claim 11, further comprising:
    collecting the first waste stream from a plurality of waste apertures in the housing.

14. The method of claim 13, further comprising:
    advancing the first waste stream from the waste apertures to the waste collector by using an auger.

15. The method of claim 11, wherein combining both the toner of the second waste stream and the toner of the first waste stream into the waste collector under the influence of gravity further comprises:
- injecting the effluent and toner in the second waste stream at a distal end of the cyclone separator with respect to the waste collector;
- injecting the toner at a proximal end of the cyclone separator with respect to the waste collector;
- collecting the toner of the second waste stream and the toner of the first waste stream into a combined particle stream that enters the waste collector.

16. A method of isolating toner from an electrophotographic device housing, the method comprising:
- transporting a first waste stream of toner from the housing;
- transporting a second waste stream of effluent and toner from the housing;
- combining both the toner of the second waste stream and the toner of the first waste stream into a waste collector under the influence of gravity;
- filtering the effluent to contain an effluent-borne particle stream and passing a gaseous effluent with a filter;
- removing ozone from the gaseous effluent; and
- blowing the gaseous effluent with a blower;
- wherein the filter and the blower are each disposed at a location that is outside of, and downstream from, a separator.

* * * * *